United States Patent [19]

Mühl et al.

[11] Patent Number: 5,186,547
[45] Date of Patent: Feb. 16, 1993

[54] ROLLER BEARING AND SEAL ASSEMBLY

[75] Inventors: Helmut Mühl, Dietach; Johann Müllner, Steyr, both of Fed. Rep. of Germany

[73] Assignee: SKF GmbH, Schweinfurt, Fed. Rep. of Germany

[21] Appl. No.: 879,313

[22] Filed: May 7, 1992

[30] Foreign Application Priority Data

May 7, 1991 [DE] Fed. Rep. of Germany ....... 4114842

[51] Int. Cl.⁵ ..................... F16C 33/78; F16C 33/80
[52] U.S. Cl. ................... 384/480; 384/481; 384/484
[58] Field of Search ............ 384/480, 484, 481, 139, 384/144, 148

[56] References Cited

U.S. PATENT DOCUMENTS 4,093,324  6/1978  Carrigan ................. 384/480
4,799,808  1/1989  Otto ...................... 384/481
4,972,939  11/1990  Uttke et al. ............. 384/480
5,028,054  7/1991  Peach ..................... 384/480

Primary Examiner—Lenard A. Footland
Attorney, Agent, or Firm—Eugene E. Renz, Jr.

[57] ABSTRACT

A roller bearing seal assembly for supporting the drive rolls of a continuous casting machine including an angle ring forming a sealing gap and a lamellar ring seal between the angle ring and a bearing or bearing housing. The angle ring has an axially directed shank and a radially oriented shank mounted in either the outer ring of the bearing, or in the bearing housing in such a way that its axially oriented shank projects beyond the end surface of the roller bearing or housing. The lamellar ring seal is installed between the radially oriented shank of the angle ring and the lateral surface of the inner ring of the bearing. A rotary shaft lip seal is installed on the side of the angle ring facing the interior of the bearing. The axially oriented shank of the angle ring extends into a ring-shaped groove in a drive roll end surface opposite the end surface of the roller bearing or housing.

6 Claims, 2 Drawing Sheets

ROLLER BEARING AND SEAL ASSEMBLY

FIELD OF THE INVENTION

The present invention relates to roller bearing and seal assemblies and has specific application to bearing and seal assemblies of the type used to support the drive rolls of a continuous casting machine.

BACKGROUND OF THE INVENTION

Bearing and seal assemblies of the type to which the present invention relates generally include a seal member having both an angle ring forming a sealing gap, and a lamellar ring seal mounted between the angle ring and one of the bearing rings of a roller bearing or the bearing housing. Seal assemblies used to support the drive rolls of continuous casting machines are subjected to considerable thermal stresses and there is also the danger of contamination of these seals by exposure to coolant, steam, scale and other foreign matter.

Previous sealing devices have been proposed in an attempt to solve these problems, however none of them have proved as satisfactory as the present invention. For example, West German Patent No. 3,503,344 A1 shows a seal wherein the angle ring is mounted next to the bearing seating surface in the transition region between the neck of the roll and the roll itself. The angle ring has a shank which rest against the end surface of the roll and another shank which projects into the intermediate space between the inner ring of the bearing and the housing bore to form a sealing gap with the housing bore. The shank has a lateral surface which mounts a lamellar ring seal so that it engages in a peripheral groove in the bore of the housing. A shoulder with a ring shaped groove is provided in the transition region between the roll neck and the roll to provide a means for insuring that the angle ring remains fastened to the end surface of the drive roll. The angle ring is designed with an appropriate complementary shape to fit into this ring-shaped groove.

It has been found that the bearing and seal assembly described above is complicated and expensive to manufacture by reason of the special customized complicated shape needed for the drive roll. Furthermore, the surface in the contact area of the angle ring needs to be machined with great precision to guarantee a sealing effect between the angle ring and the roll or roll neck.

Furthermore, in solving the problem in this fashion, it is difficult to position the angle ring in a precisely concentric manner with respect to the outer ring of the bearing or the housing even though this concentricity is necessary for the formation of the sealing gap. This arrangement also has the draw back that the danger of breakage of the drive roll is increased because of the sharp-edged transitions which occur in the area of the shoulders producing a so-called "notch effect."

SUMMARY OF THE INVENTION

With the foregoing in mind, it is the object of the present invention to provide a roller bearing and seal assembly characterized by novel features of construction and arrangement, adapted to support the drive rolls of a continuous casting line, the seal being of a simplistic design which seals a roller bearing reliably and which is integrated into the roller bearing.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
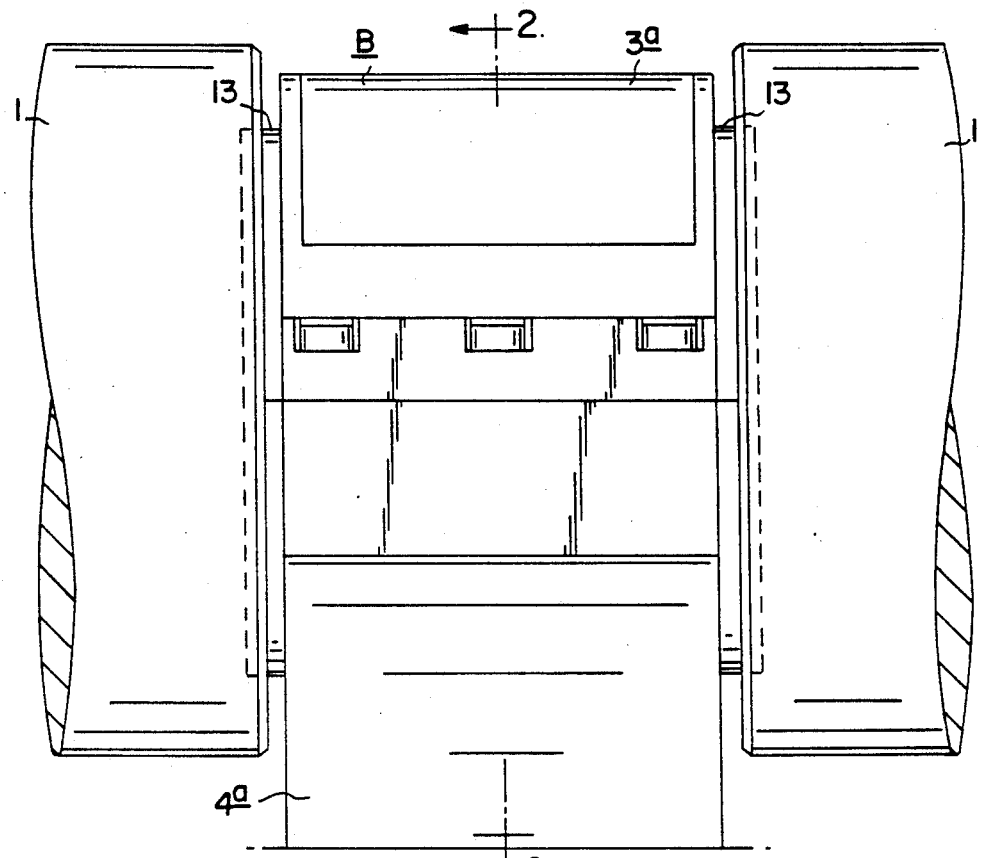
FIG. 1 is a fragmentary side elevational view of the roller bearing and seal assembly of the present invention, mounted on a drive roll.
Figure 2:
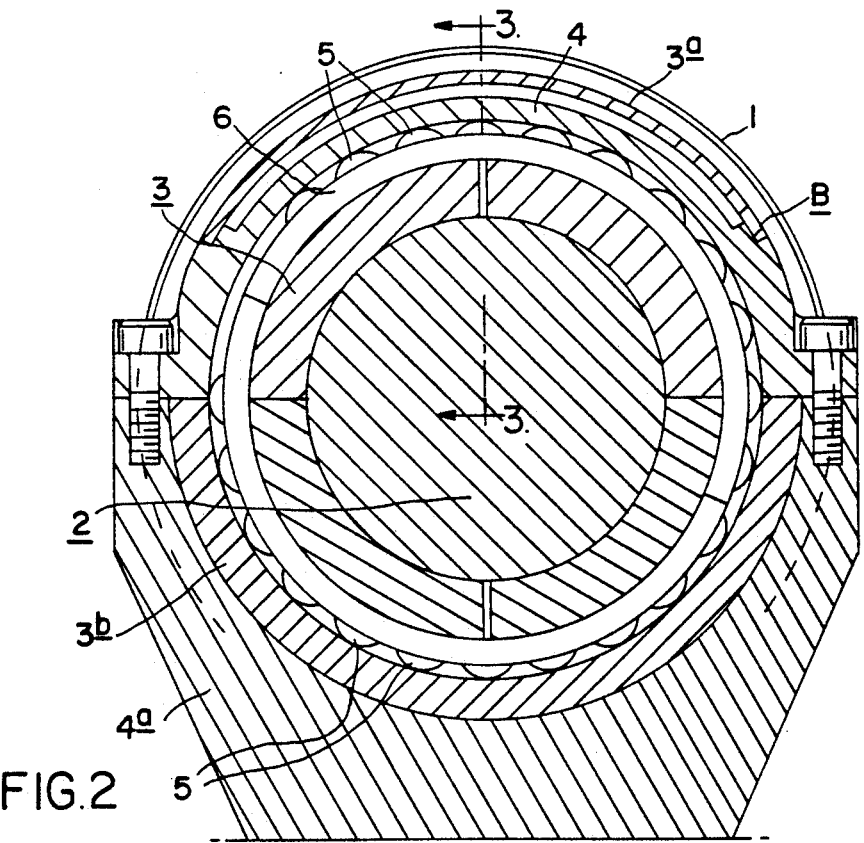
FIG. 2 is a sectional elevational view showing the details of a roller bearing and seal assembly taken on line 2—2 of FIG. 1.
Figure 3:
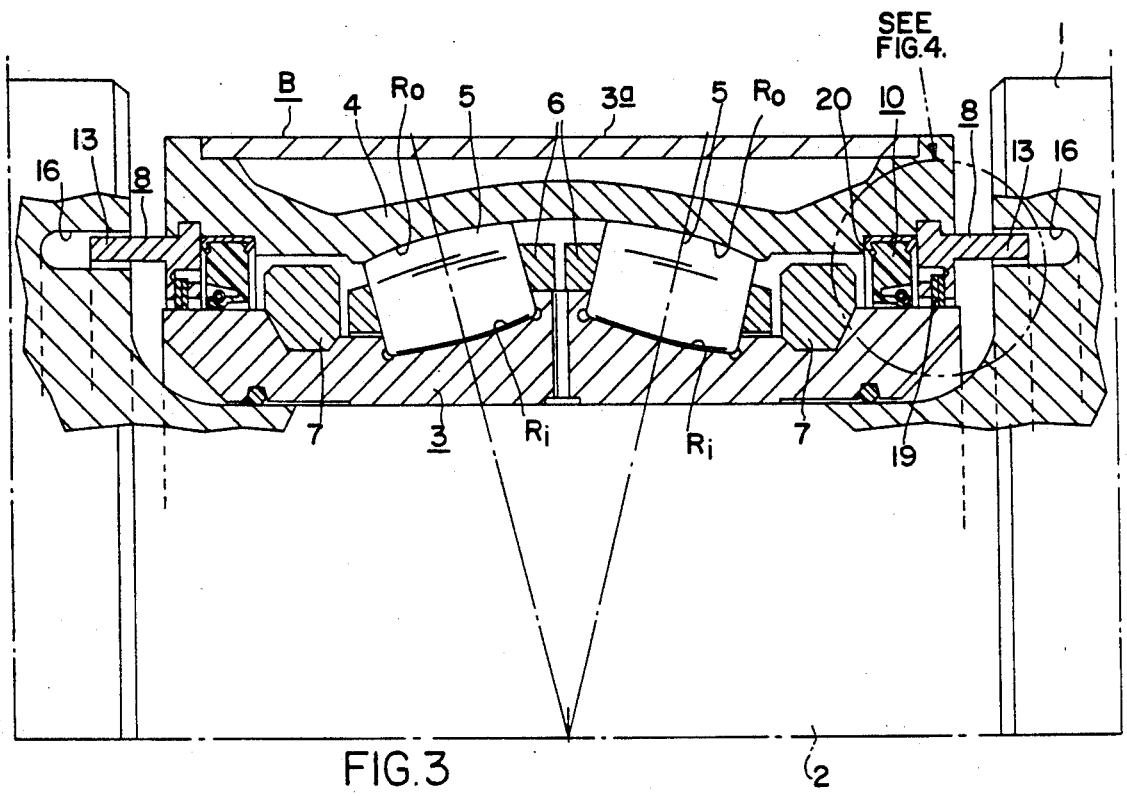
FIG. 3 is an enlarged fragmentary sectional view taken on line 3—3 of FIG. 2.

Referring now to the drawings, there is shown a self aligning rolling bearing and seal assembly in accordance with the present invention mounted on a bearing seat so that it can slide axially on a roll neck 2 of a drive roll 1 of a continuous casting machine. The roller bearing includes an inner ring 3, a housing 3a and a plurality of self-aligning spherical rollers 5 which ride on confronting inner and outer raceways $R_i$ and $R_o$, respectively, formed on confronting surfaces of the inner ring 3 and housing 3a. As illustrated, the rollers 5 are circumferentially spaced and guided in conventional cage assemblies 6. The housing 3a is a split housing having an upper part 4 which is the no-load zone having raceways formed therein for the rollers 5. The lower housing part 4a characterizes the load zone, and an outer ring half 3b having raceways is installed.

The bearing is therefore of the split ring design so that it can be mounted on a roll neck 2 formed on the outer circumferential surfaces of the roll 1. The axially divided bearing inner ring 3 is held together on the bearing seat of roll neck 2 by means of a pair of tension rings 7. The tension rings 7 are also of two-part construction wherein the halves of each are held together by suitable screw fasteners. The housing 3a is likewise of a split configuration in the axial direction thereby defining two halves which are secured together to form an integral unit by suitable screw fasteners.

The seal assembly includes a first sealing element in the form of an angle ring 8 having a circumferentially extending radially outwardly directed flange 12 which engages in peripheral groove 11 in the housing 4. The angle ring 8 has an axially outwardly directed shank 13 which projects beyond the axial end surface 14 of the housing 4 and engages in a ring shaped groove 16 formed in the drive roll ends surface 15 which confronts the axial end face 14 of the self-aligning rolling bearing B. This arrangement as illustrated provides a labyrinth seal in the front of the bearing B.

The angle ring 8 also includes a radially inwardly directed shank 17 having an inner circumferentially extending surface 17a separated by a small distance D from the lateral end surface 18 of the inner ring 3. A lamellar ring seal 19, comprising a series of spring steel rings 19a engages and is seated in a ring shaped groove 21 in the bore surface of the radially oriented shank 17. The lamellar ring seal 19 rests on the lateral surface 18 of the inner ring 3 and is cooperatively associated with angle ring 8 to form a diaphragm gland.

Figure 4:
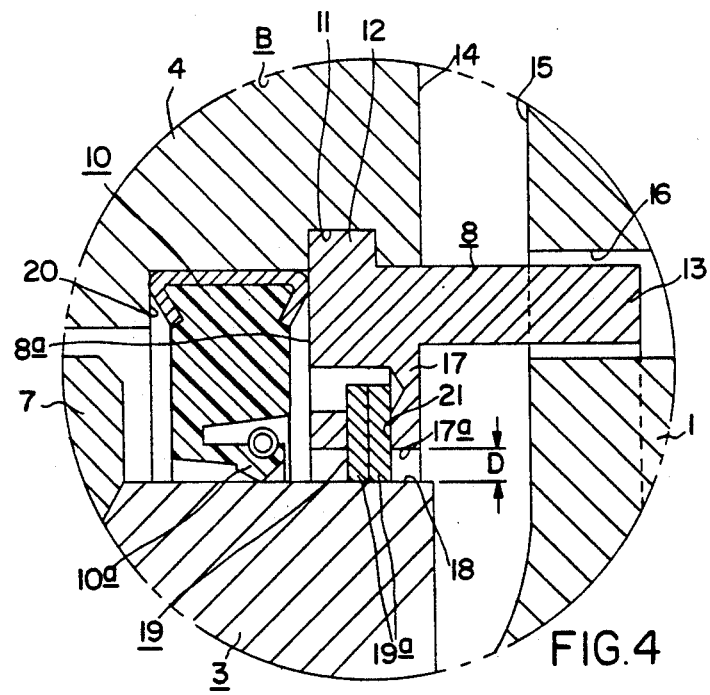
FIG. 4 is a greatly enlarged sectional view of the details contained within the dot and dash circle shown in FIG. 3 and designated "FIG. 4."

The seal assembly further includes a rotary shaft seal 10 having a radially inwardly directed sealing lip 10a which engages the lateral surface 18 of inner ring 3 and is positioned between the inner axial end face 8a of angle ring 8 facing the interior of the bearing B and shoulder 20 in the bore housing 4. The rotary shaft seal 10 is preferably made of a rubber like synthetic material and is generally of the type shown in the Pringle U.S. Pat. No. 3,106,405 which issued Oct. 8, 1963 entitled ROTARY SHAFT SEALING RING HAVING REMOVABLE METAL ANNULUS SUPPORTED ELASTIC RING, and which patent is incorporated by reference. The sealing lip 10a opens if pressure comes from the opposite left hand side as viewed in FIG. 4. Rotary shaft seal 10 and angle ring 8 are preferably split ring assemblies to facilitate assembly in the manner shown and described. The two rings comprising the angle ring 8 are held together by the upper and lower halves of the housing 4, 4a which are described above, or are maintained in the assembled relation by suitable screw fasteners. The lamellar rings 19a of lamellar ring seal 19 are designed as double rings and can be mounted by twisting them in place.

Even though particular embodiments of the invention have been illustrated and described herein, it is not intended to limit the invention and changes and modifications may be made therein within the following claims.

What is claimed is:

1. A roller bearing and seal assembly for supporting the drive rolls of a continuous casting machine including an angle ring forming a sealing gap and a lamellar ring seal between the angle ring and a bearing or bearing housing, comprising:

an angle ring having an axially directed shank and a radially oriented shank mounted in the outer ring of the bearing or in the bearing housing in such a way that its axially oriented shank projects beyond the end surface of the roller bearing or housing;

a lamellar ring seal installed between the radially oriented shank of the angle ring and the lateral surface of the inner ring of the bearing;

a rotary shaft lip seal installed on the side of the angle ring facing the interior of the bearing; and said axially oriented shank of the angle ring extending into a ring-shaped groove in a drive roll end surface opposite the end surface of the roller bearing or housing.

2. The roller bearing and seal assembly of claim 1, further characterized in that the lamellar ring seal is mounted in a ring-shaped groove in the bore surface of the radially oriented shank of the angle ring, and rests on the lateral surface of the inner ring of the bearing.

3. The roller bearing seal assembly of claim 1, further characterized in that the bore surface of the radially oriented shank of the angle ring is opposite the lateral surface of the inner ring of the bearing and is separated from it by a short distance.

4. The roller bearing seal assembly of claim 1, further characterized in that the rotary shaft seal is mounted between the end surface of the angle ring facing the interior of the bearing and a shoulder in the bore of the outer ring of the bearing or of the housing.

5. The roller bearing seal assembly of claim 1, further characterized in that the angle ring and the rotary shaft seal are split in the axial direction.

6. The roller bearing seal assembly of claim 5, further characterized in that the angle ring has a flange on its peripheral surface, said flange engaging in a corresponding peripheral groove in the bore of the outer ring or housing.

* * * * *